United States Patent
Lin et al.

(10) Patent No.: US 8,132,353 B2
(45) Date of Patent: Mar. 13, 2012

(54) LASER SIGHT

(75) Inventors: Chen-Yeh Lin, Taichung (TW);
Shang-Yung Liang, Taichung (TW);
Chi-Shin Lin, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 20 days.

(21) Appl. No.: 12/132,731

(22) Filed: Jun. 4, 2008

(65) Prior Publication Data

US 2009/0223107 A1 Sep. 10, 2009

(30) Foreign Application Priority Data

Mar. 10, 2008 (TW) ................................. 97108285 A

(51) Int. Cl.
*F41G 1/00* (2006.01)

(52) U.S. Cl. ............................ 42/115; 42/125; 42/122

(58) Field of Classification Search .............. 42/115, 42/122, 125, 136, 137
See application file for complete search history.

(56) References Cited

U.S. PATENT DOCUMENTS

| | | | | |
|---|---|---|---|---|
| 2,583,042 A * | 1/1952 | Dayton | | 42/122 |
| 3,079,833 A * | 3/1963 | Malinowski | | 356/11 |
| 3,597,040 A * | 8/1971 | Gotoh | | 359/424 |
| 4,815,217 A * | 3/1989 | Repa | | 42/137 |
| 5,323,555 A * | 6/1994 | Jehn | | 42/115 |
| 5,771,623 A * | 6/1998 | Pernstich et al. | | 42/115 |
| 5,892,617 A * | 4/1999 | Wallace | | 359/353 |
| 6,691,447 B1 * | 2/2004 | Otteman | | 42/122 |
| 6,721,095 B2 * | 4/2004 | Huber | | 359/427 |
| 2005/0091903 A1 * | 5/2005 | Smith, III | | 42/122 |
| 2007/0062091 A1 * | 3/2007 | Thomas et al. | | 42/119 |
| 2008/0016748 A1 * | 1/2008 | Murg et al. | | 42/122 |
| 2009/0002856 A1 * | 1/2009 | Thorpe et al. | | 359/822 |
| 2009/0049733 A1 * | 2/2009 | Matthews | | 42/122 |

* cited by examiner

*Primary Examiner* — Michael Carone
*Assistant Examiner* — Samir Abdosh
(74) *Attorney, Agent, or Firm* — Thomas|Kayden

(57) ABSTRACT

A laser sight is disclosed, including a housing which defines a first central axis, an objective module, an eyepiece, an erecting system, and an adjusting member. The objective module is fixed to a first end of the housing, and the eyepiece is fixed to a second end of the housing, opposite to the first end. The erecting system is movably disposed between the objective module and the eyepiece and comprises a laser rangefinder defining a second central axis. The adjusting member is movably disposed on the housing and connected to the erecting system. During windage and elevation adjustments, the adjusting member moves with respect to the housing and impels the laser rangefinder, such that the first and second axes form an included angle.

13 Claims, 5 Drawing Sheets

LASER SIGHT

BACKGROUND OF THE INVENTION

1. Field of the Invention

The invention relates in general to a laser sight and in particular to a laser sight mounted on a firearm.

2. Description of the Related Art

A conventional telescopic sight of U.S. Pat. No. 5,771,623 (issued on Jun. 30, 1998) primarily includes a housing, an objective movably disposed in the housing, an erecting system, an eyepiece, and a laser rangefinder. The erecting system is fixed to the housing and cannot be adjusted. The laser rangefinder includes a transmitter, a receiver, a display, and a set of beam splitters, wherein light from the transmitter propagates through the objective to a target. The light is reflected by the target and returns into the telescopic sight, such that the receiver detects the light and acquires distance information of the target.

Regarding to U.S. Pat. No. 5,771,623, position and posture of the objective can be modified by an adjusting member for windage and elevation adjustments. However, this conventional sight structure usually requires large dimensions, reduces water resistance and has difficult varifocal mechanism designs.

BRIEF SUMMARY OF INVENTION

The invention provides a laser sight including a housing which defines a first central axis, an objective module, an eyepiece, an erecting system, and an adjusting member. The objective module is fixed to a first end of the housing, and the eyepiece is fixed to a second end of the housing, opposite to the first end. The erecting system is movably disposed between the objective module and the eyepiece and comprises a laser rangefinder defining a second central axis. The adjusting member is movably disposed on the housing and connected to the erecting system. During windage and elevation adjustments, the adjusting member moves with respect to the housing and impels the laser rangefinder, such that the first and second axes form an included angle.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
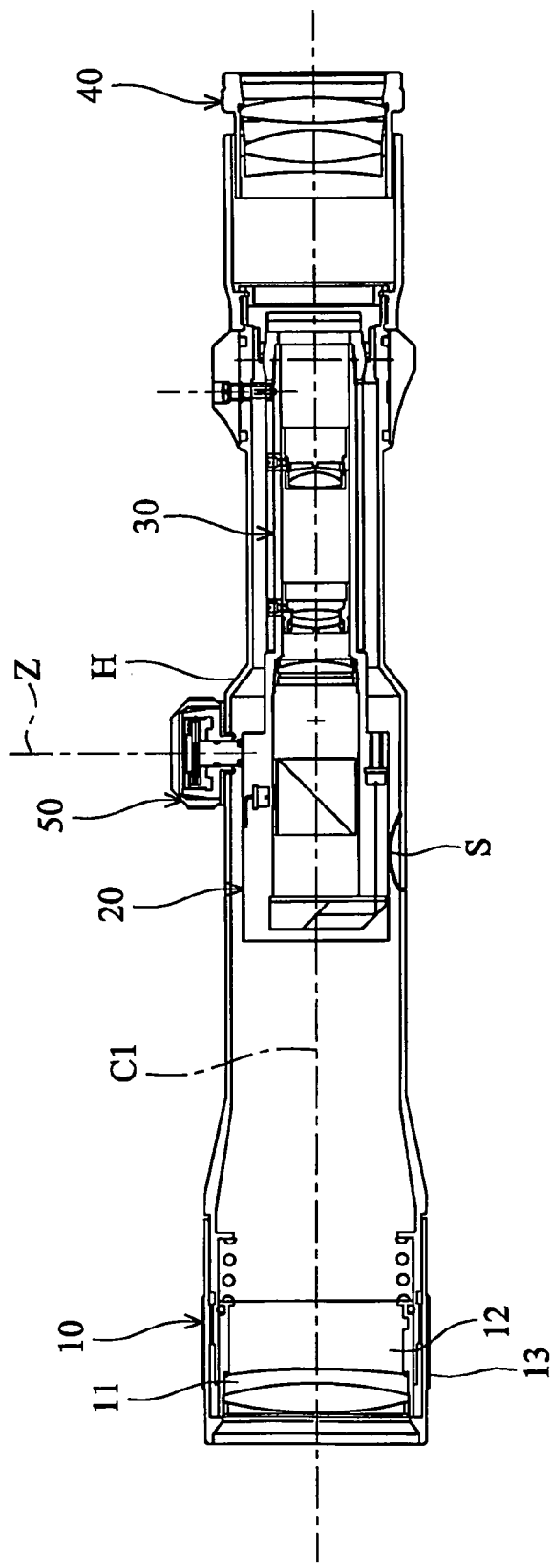
FIG. 1 is a sectional view of an embodiment of a laser sight.

Referring to FIG. 1, an embodiment of a laser sight can be used as a telescope and a rangefinder. The laser sight, such as a telescopic sight mounted on a firearm, primarily comprises an objective module 10, a laser rangefinder 20, an erecting unit 30, an eyepiece 40, a tubular housing H, and at least an adjusting member 50 movably disposed on the housing H. As shown in FIG. 1, the laser rangefinder 20 and the erecting unit 30 are received in the housing H. The objective module 10 and the eyepiece 40 are fixed to opposite ends of the housing H, wherein a first central axis C1 of the housing H is extended through the centers of the objective module 10 and the eyepiece 40. The objective module 10, the laser rangefinder 20, the erecting unit 30, and the eyepiece 40 comprise a main optical sight mechanism. Users can simultaneously observe an object through the laser sight and read distance information of the object by the laser rangefinder 20.

In this embodiment, the objective module 10 comprises a varifocal objective lens 11, a chamber 12 and a focal length ring 13. The objective lens 11 is disposed in the chamber 12, and the length ring 13 surrounds the chamber 12 for adjusting the focal length of the objective lens 11.

Figure 2:
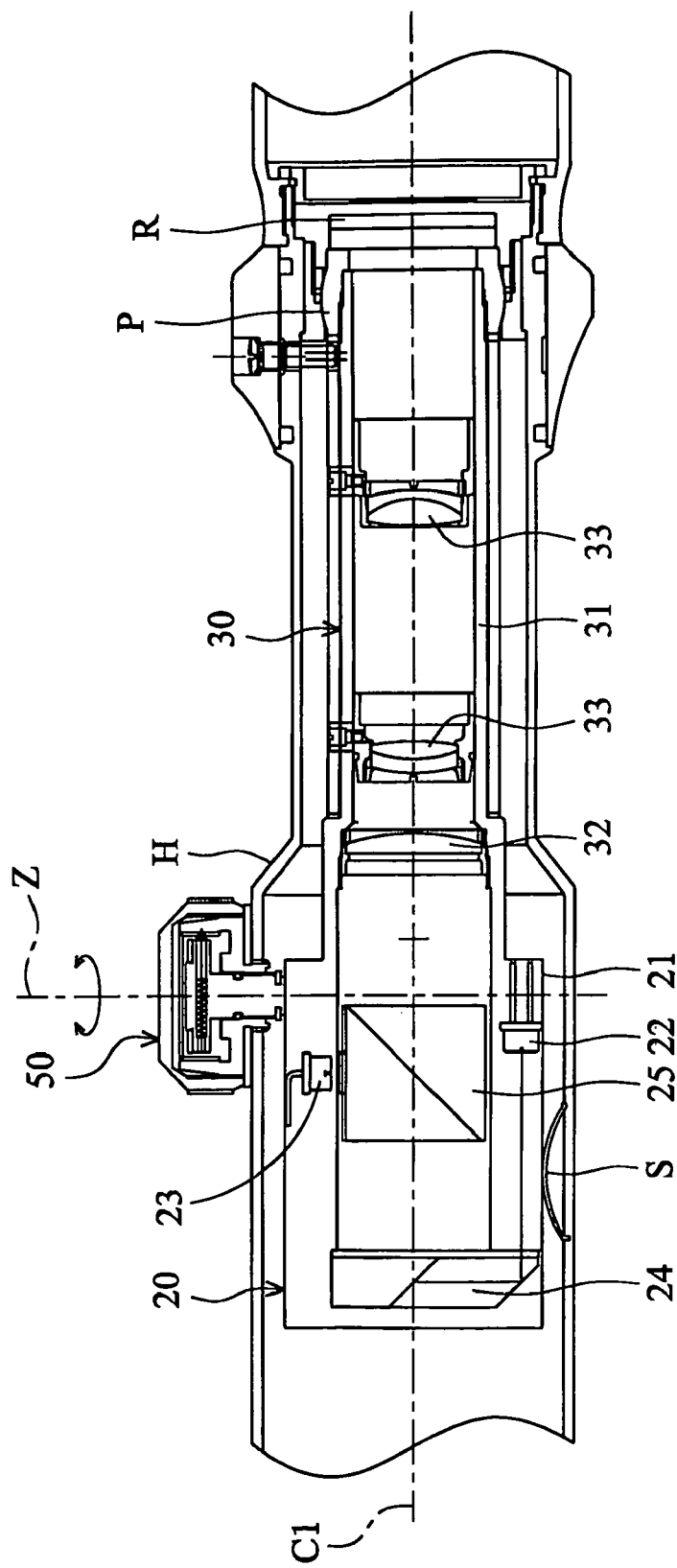
FIG. 2 is a sectional view of an erecting system of the laser sight in FIG. 1.
Figure 3A:
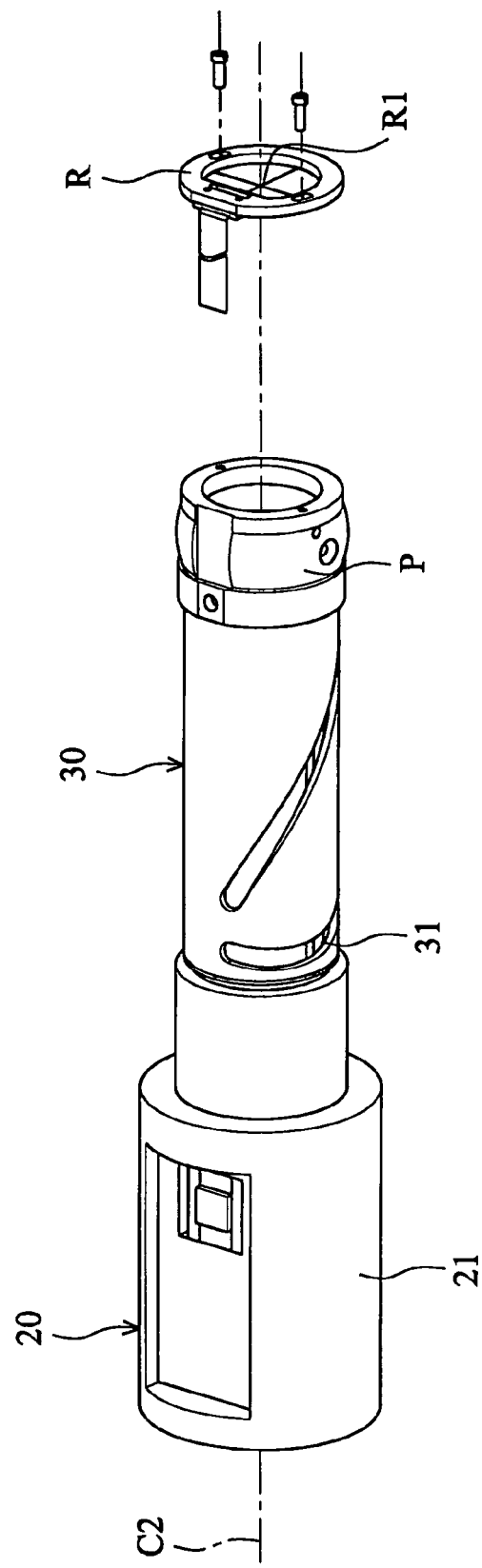
FIG. 3A is an exploded diagram of a laser rangefinder, an erecting unit, and a display.

Referring to FIGS. 2 and 3A, the rangefinder 20 and the erecting unit 30 are connected to each other and form an erecting system. The erecting system is pivotally connected to the housing H via an universal joint P at an end thereof, whereby the erecting system can be moved with respect to the first central axis C1 for windage and elevation adjustments. The adjusting member 50 may be a knob disposed on a side of the housing H, wherein the knob is rotatable and movable with respect to the housing H along a Z axis. In this embodiment, the first central axis C1 is substantially perpendicular to the Z axis. In some embodiments, more than one rotatable knob can be disposed on different sides of the housing H (one of the knobs may be disposed perpendicular to the first central axis C1 and Z axis) for windage and elevation adjustments in vertical and horizontal directions.

As shown in FIG. 2, the adjusting member 50 is disposed through the housing H and abuts the laser rangefinder 20. A resilient member S, such as a flexible metal sheet, is disposed between the laser rangefinder 20 and the housing H, opposite to the adjusting member 50. During windage and elevation adjustments, the adjusting member 50 can be rotated to move downward or upward along a Z axis. When the adjusting member 50 descends toward the laser rangefinder 20, the erecting system is impelled and shifted downwardly. When the adjusting member 50 moves upward, the erecting system is impelled by the resilient member S and shifted upwardly.

In this embodiment, the objective module 10 is fixed to a front end of the housing H, and posture of the erecting system can be modified by turning the adjusting member 50 for windage and elevation adjustments. Since the objective module 10 does not require movement during windage and elevation adjustments, water resistance is increased and varifocal mechanism designs are simplified, thus enabling clear focus on distant targets. Furthermore, since the conventional erecting system is fixed to the housing and comprises circuit devices therein, large dimensions are required, and windage and elevation adjustments cannot be performed by adjusting the erecting system. To address the drawbacks of the conventional erecting system, the circuit devices of the erecting system can be integrated and disposed on the outside of the housing H, such that the erecting system is more compact and adjustable for windage and elevation adjustments.

Figure 4:
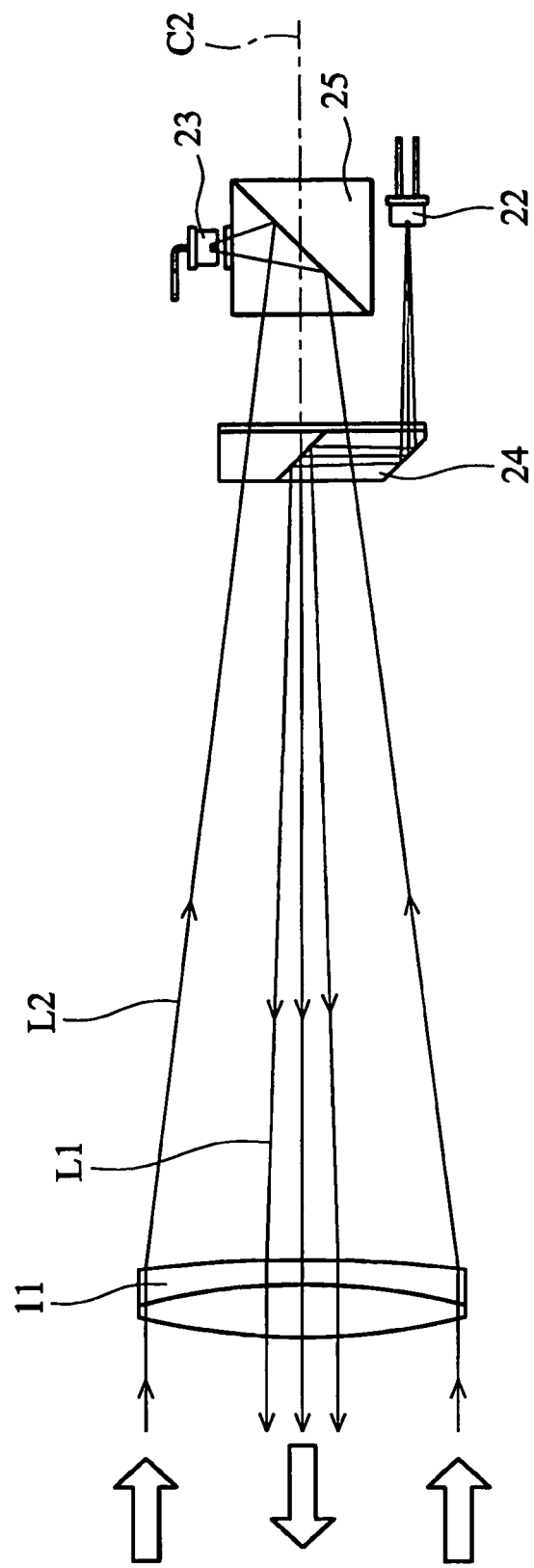
FIG. 4 is a perspective diagrams of a laser rangefinder and an objective lens.

Referring to FIGS. 1, 2 and 4, the laser rangefinder 20 is movably disposed between the objective module 10 and the eyepiece 40, wherein the laser rangefinder 20 and the eyepiece 40 correspond to the objective module 10. As shown in FIGS. 2 and 4, the laser rangefinder 20 primarily comprises a first barrel 21, a transmitter 22, a receiver 23, a first prism 24, and a second prism 25. The transmitter 22, the receiver 23, the first prism 24, and the second prism 25 are received in the first barrel 21.

Referring to FIG. 4, the transmitter 22 transmits a laser signal L1 through the first prism 24 and the objective module 10 to an object. Consequently, the laser signal L1 is reflected by the object (as the laser signal L2 shown in FIG. 4) and propagates through the objective module 10 and the second prism 25 to the receiver 23. Hence, distance information of the object is acquired by the laser rangefinder 20 receiving the laser signal L2. In this embodiment, the transmitter 22 is a laser diode (LD), and the receiver 23 is an avalanche photodiode (APD), wherein the laser signals L1 and L2 both propagate through the objective lens 11. During windage and elevation adjustments, the laser rangefinder 20 is moved with respect to the housing H by tuning the adjusting member 50, such that a second central axis C2 (FIGS. 3A and 4) of the laser rangefinder 20 and the first central axis C1 of the housing H appropriately form an included angle.

Referring to FIGS. 2 and 3A, the erecting unit 30 primarily comprises a second barrel 31, a collector lens 32, and two erecting lenses 33, wherein the collector lens 32 and the erecting lenses 33 are disposed in the second barrel 31 for erecting the inverted image formed through the objective lens 11. The second barrel 31 is connected or integrally formed with the first barrel 21, and amounts of the collector lens 32 and the erecting lens 33 are determined by mechanism design requirements.

Figure 3B:
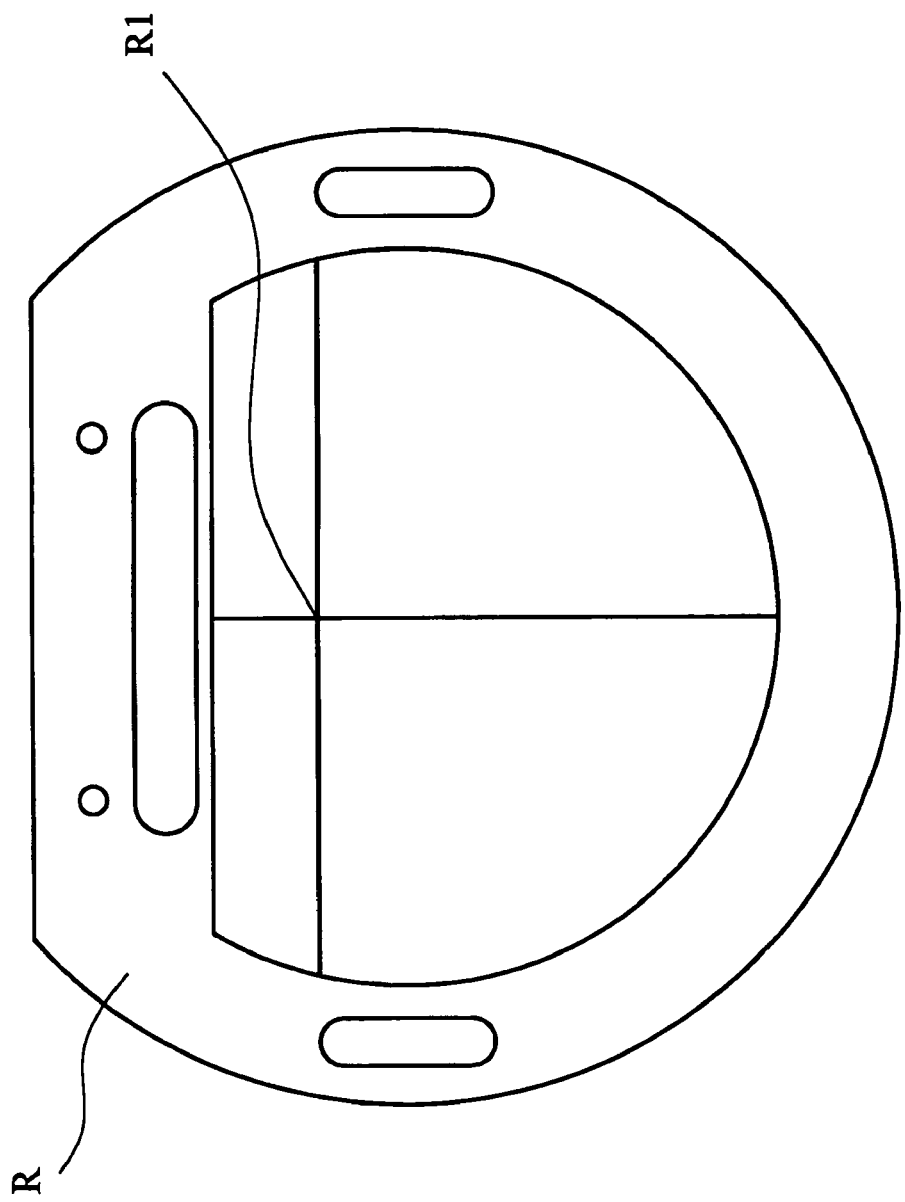
FIG. 3B is a perspective diagram of the display in FIG. 3A.

As shown in FIGS. 2 and 3A, the erecting unit 30 further comprises a display R disposed between the universal joint P and the eyepiece 40. The display R can be an LED panel for displaying distance information measured by the laser rangefinder 20, wherein a reticle R1 is formed on the display R and used to be aimed at the target. Referring to FIG. 3B, during windage and elevation adjustments, the reticle R1 is moved with the erecting system for aiming at the target.

The invention provides a laser sight capable for application in a telescope and a rangefinder. The laser sight comprises a movable erecting system and an adjusting member for modifying posture of the erecting system. Since the objective module does not require movement during windage and elevation adjustments, water resistance is increased and varifocal mechanism designs are simplified, thus facilitating convenient usage and enabling clear focus on distant targets.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A laser sight, comprising:
a housing, defining a first central axis;
an objective module, firmly fixed to a first end of the housing and immovable relative to the housing, wherein the objective module comprises an objective lens;
an eyepiece, fixed to a second end of the housing, opposite to the first end;
an erecting system, movably disposed between the objective module and the eyepiece, wherein the erecting system comprises a second barrel, a collector lens, an erecting lens, an universal joint movably connected to the housing, and a laser rangefinder defining a second central axis;
wherein the collector and the erecting lenses are disposed in the second barrel and movable with the rangefinder for erecting an inverted image formed through the objective lens, and the laser rangefinder comprises a transmitter and a receiver, wherein the transmitter transmits a laser signal to an object, and the laser signal is reflected by an object through the objective module to the receiver; and
an adjusting member, movably disposed on the housing and connected to the erecting system, wherein the first and second axes form an included angle when the laser rangefinder is impelled by the adjusting member with respect to the housing.

2. The laser sight as claimed in claim 1, wherein the laser rangefinder further comprises a first prism and a second prism, wherein the laser signal is transmitted through the first prism and the objective module to the object, and the laser signal is reflected by the object and propagates through the objective module and the second prism to the receiver.

3. The laser sight as claimed in claim 2, the laser rangefinder further comprising a first barrel contacting the adjusting member, wherein the transmitter, the receiver, and the first and second prisms are accommodated in the first barrel.

4. The laser sight as claimed in claim 2, wherein the transmitter is a laser diode, and the receiver is an avalanche photodiode.

5. The laser sight as claimed in claim 1, further comprising a display disposed between the universal joint and the eyepiece.

6. The laser sight as claimed in claim 1, further comprising a display disposed at one end of the erecting system.

7. The laser sight as claimed in claim 6, wherein the display comprises an LED panel displaying distance information measured by the laser rangefinder.

8. The laser sight as claimed in claim 6, wherein the display comprises a reticle.

9. The laser sight as claimed in claim 1, wherein the adjusting member comprises a knob rotatable about a rotatable axis thereof, and the knob is movable with respect to the housing along the rotatable axis.

10. The laser sight as claimed in claim 9, wherein the rotatable axis is substantially perpendicular to the first central axis.

11. The laser sight as claimed in claim 1, wherein the laser rangefinder further comprises a resilient member disposed between the erecting system and the housing.

12. The laser sight as claimed in claim 11, wherein the resilient member comprises a metal sheet.

13. The laser sight as claimed in claim 1, wherein the objective module comprises a chamber, an objective lens received in the chamber, and a focal length ring surrounding the chamber for adjusting a focal length of the objective lens.

* * * * *